Patented Feb. 22, 1927.

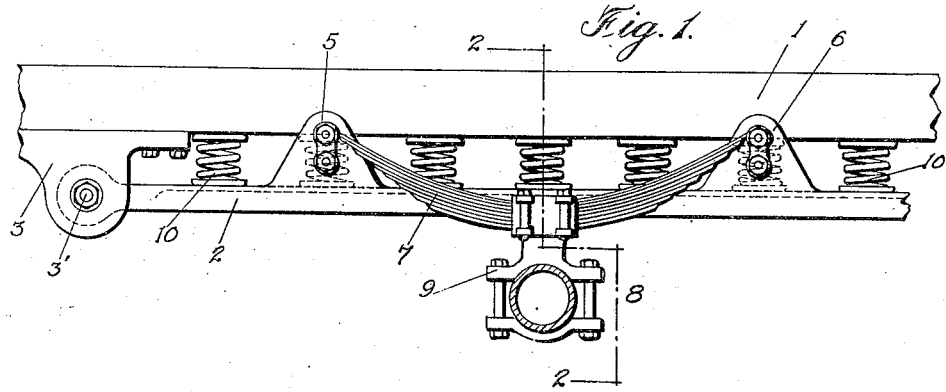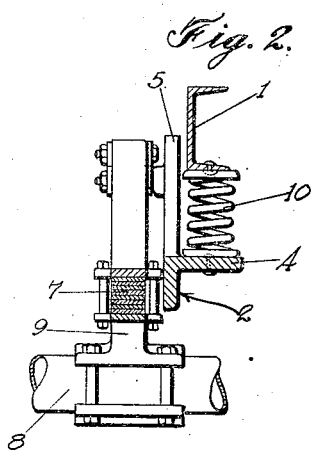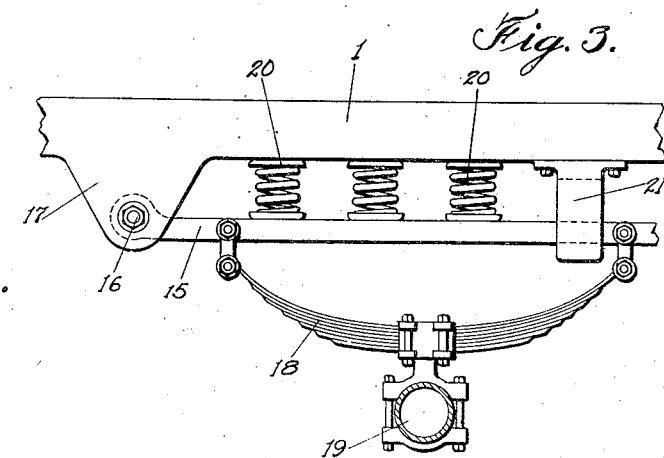

1,618,559

UNITED STATES PATENT OFFICE.

PHILIP OCTAVUS SOLON, OF OAKLAND, CALIFORNIA.

AUTO SPRING SUSPENSION.

Application filed April 29, 1924. Serial No. 709,759.

My invention is an improved spring suspension, particularly applicable to automobile trucks, cars, etc.

The object of my invention is to provide an auxiliary resilient means to the usual springs of the vehicle, in which the road shocks are further absorbed. Another object is to provide a spring suspension which is simple in construction, and efficient in operation.

My invention pertains particularly to an auxiliary spring suspension for vehicles in which a sub-frame is mounted below a main frame and has a series of coil springs therebetween, and a spring of the ordinary type from the sub-frame to an axle. This sub-frame may be connected to the chassis frame in any suitable manner, that shown being by a pivotal connection. The chief characteristic of the invention is that the sub-frame is of considerable length extending substantially parallel to the chassis frame, and has a considerable number of small helical springs between the two frames.

In the annexed drawing I have shown my spring suspension applied to an automobile, but it is understood that it may be employed upon any vehicle or car as desired.

Figure 1 is a side view of my spring suspension.

Figure 2 is a sectional view taken on the line 2—2 of Figure 1.

Figure 3 is a side view of a slightly modified form of suspension.

Referring more particularly to the drawing, the numeral 1 indicates the chassis frame of the vehicle. A sub-frame 2 is pivoted to a bracket 3, as at 3', which is suitably secured to the chassis 1. The lever 2 is preferably formed in an L section, the horizontal arm 4 of which extends under the chassis 1. Ears 5 and 6 are formed on the lever 2 to which a leaf spring 7 is suitably secured, and these ears bear against the side of chassis 1 to prevent lateral movement of the frame 2. The spring main 7 is secured to the vehicle axle 8 by the usual shackle 9.

A plurality of auxiliary springs 10 are positioned at intervals along the sub-frame 2 between said sub-frame and the bottom of the chassis frame 1. Thus it will be seen that any movement of the axle 8 will result in a flexure of the spring 7, and a movement of the sub-frame 2 upon its pivot 3'.

The movement of said sub-frame compresses the springs 10, which will not transmit a large movement to the chassis until entirely compressed.

In the modified form shown in Figure 3, the sub-frame 15 is pivoted at 16 to an ear 17 depending from the chassis frame 1. The usual vehicle spring 18 is secured to the sub-frame 17, and mounted upon the axle 19. A plurality of coil springs 20 are positioned between the sub-frame 15 and chassis frame 1 for the purpose already described.

A suitable guide plate 21 is secured to the chassis, and bears against the sub-frame 15 to guide the same and to prevent lateral motion thereof.

From the above construction, it will be seen that the sub-frame is supported relative to the chassis frame by a considerable number of small helical springs extending lengthwise of the frames. It is not necessary that the sub-frame be pivotally connected to the chassis frame so long as it is maintained from relative longitudinal movement. The above construction, on account of the length of the sub-frame and its being substantially parallel to the chassis frame, gives a very resilient action. Other types of springs than those illustrated such as cantilever springs, full elliptic, etc., may be used.

Having described my invention, I claim:

1. In combination, a transverse vehicle axle, a leaf spring resting with its central portion thereon so as to extend forwardly and rearwardly therefrom, a longitudinal sub-frame element suspended from the ends of the leaf spring so as to lie alongside of and adjacent to the latter, and to be substantially on a level with the body section of the spring, a main frame element and a continuous line of helical springs interposed between the two frame elements and normally holding the same in spaced and parallel relation, the latter springs being dimensioned to normally hold the main frame on a level with the ends of the leaf spring.

2. In combination, a transverse vehicle axle, a leaf spring resting with its central portion thereon so as to extend forwardly and rearwardly therefrom, a longitudinal sub-frame element suspended from the ends of the leaf spring so as to lie alongside of and adjacent to the latter and to be substantially on a level with the body section of the spring, a main frame element pivoted to the first frame element so as to be spaced therefrom at the pivot, and yielding means interposed between the two elements normally holding the same in spaced and parallel relation, the spacing of the main frame from the pivot and the normal action of the yielding spacing means being such as to hold the main frame on a level with the ends of the leaf spring.

3. In combination, a transverse vehicle axle, a leaf spring resting with its central portion thereon so as to extend forwardly and rearwardly therefrom, a longitudinal sub-frame element suspended from the ends of the leaf spring so as to lie alongside of and adjacent to the latter and to be substantially on a level with the body section of the spring, a main frame element pivoted to the first frame element so as to be spaced therefrom at the pivot and a continuous line of helical springs interposed between the two frame elements normally holding the same in spaced and parallel relation, the spacing of the main frame from the pivot and the normal action of the helical springs being such as to hold the main frame on a level with the ends of the leaf spring.

4. In combination, a transverse vehicle axle, a leaf spring resting with its central portion thereon so as to extend forwardly and rearwardly therefrom, a longitudinal sub-frame element having brackets rising from one edge thereof, shackles pivoted in the ends of the spring pivotally supporting the brackets so as to cause the sub-frame to lie alongside the central portion of the spring, a main frame element and a plurality of helical springs supporting the main frame in spaced relation to the sub-frame element so that the main frame is normally on a level with the ends of the leaf spring.

In testimony whereof I affix my signature.

PHILIP OCTAVUS SOLON.